United States Patent
Armbruster et al.

(10) Patent No.: US 8,640,800 B2
(45) Date of Patent: Feb. 4, 2014

(54) CHASSIS FOR A MOTOR VEHICLE HAVING AN ELECTRICAL AXLE

(75) Inventors: Daniel Armbruster, Weil der Stadt (DE); Stephan Hennings, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 243 days.

(21) Appl. No.: 13/024,371

(22) Filed: Feb. 10, 2011

(65) Prior Publication Data

US 2011/0209934 A1  Sep. 1, 2011

(30) Foreign Application Priority Data

Feb. 26, 2010 (DE) .......... 10 2010 010 438

(51) Int. Cl.
*B60K 6/48* (2007.10)

(52) U.S. Cl.
USPC ......................... 180/65.6; 475/149

(58) Field of Classification Search
CPC .............. B60K 7/0007; B60K 17/046; B60K 2007/0046; B60K 2007/0061
USPC ............. 180/65.1, 65.22, 65.51, 65.6, 63, 59, 180/292, 293, 294, 297, 255, 348, 371, 372, 180/379, 376, 644; 475/149
See application file for complete search history.

(56) References Cited

U.S. PATENT DOCUMENTS

| | | | | |
|---|---|---|---|---|
| 1,093,631 A | * | 4/1914 | Kennedy | 180/349 |
| 1,251,749 A | * | 1/1918 | Cilley | 180/65.6 |
| 1,728,889 A | * | 9/1929 | Kemble | 180/24.07 |
| 1,810,834 A | | 12/1930 | Klein | |
| 3,027,960 A | * | 4/1962 | Ditel | 180/244 |
| 3,439,767 A | * | 4/1969 | Lynes et al. | 180/60 |
| 3,799,284 A | * | 3/1974 | Hender | 180/65.25 |
| 4,284,158 A | * | 8/1981 | Schield | 180/344 |
| 4,454,640 A | * | 6/1984 | Egusa et al. | 29/898.063 |
| 4,953,646 A | * | 9/1990 | Kim | 180/65.245 |
| 5,120,282 A | * | 6/1992 | Fjallstrom | 475/5 |
| 5,168,946 A | * | 12/1992 | Dorgan | 180/6.44 |
| 5,718,300 A | * | 2/1998 | Frost | 180/65.1 |
| 5,743,347 A | * | 4/1998 | Gingerich | 180/65.1 |
| 5,751,081 A | * | 5/1998 | Morikawa | 310/83 |
| 5,829,542 A | * | 11/1998 | Lutz | 180/65.6 |

(Continued)

FOREIGN PATENT DOCUMENTS

| | | |
|---|---|---|
| DE | 3725620 A1 | 2/1989 |
| DE | 44 34 237 | 3/1996 |

(Continued)

*Primary Examiner* — John R Olszewski
*Assistant Examiner* — Brodie Follman
(74) *Attorney, Agent, or Firm* — Gerald E. Hespos; Michael J. Porco; Matthew T. Hespos

(57) ABSTRACT

A chassis (1) for a motor vehicle has an electrical axle (2) with two electrical machines (4) for respectively driving two wheels (6). The chassis (1) also has a step-down gear mechanism (10, 11) arranged between the respective electrical machine and the associated wheel. Each step-down gear mechanism is connected to the respective wheel by a cardan shaft. The respective rotation axes (5, 5) of the two electrical machines are arranged parallel and next to one another. The chassis enables each wheel to be mounted in a non-rigid manner and permits the overall length of the electrical machines to be varied on account of the arrangement of the rotation axes of the electrical machines.

18 Claims, 1 Drawing Sheet

(56) References Cited

U.S. PATENT DOCUMENTS

| | | | |
|---|---|---|---|
| 5,878,830 A | 3/1999 | Ruppert et al. | |
| 5,915,488 A * | 6/1999 | Fliege | 180/65.22 |
| 5,927,417 A * | 7/1999 | Brunner et al. | 180/65.6 |
| 5,947,855 A * | 9/1999 | Weiss | 475/5 |
| 6,024,182 A * | 2/2000 | Hamada et al. | 180/6.28 |
| 6,053,833 A * | 4/2000 | Masaki | 475/2 |
| 6,349,782 B1 * | 2/2002 | Sekiya et al. | 180/65.25 |
| 6,662,896 B1 * | 12/2003 | Karlsson | 180/348 |
| 6,727,620 B2 * | 4/2004 | White et al. | 310/112 |
| 6,749,532 B2 * | 6/2004 | Wachauer | 475/5 |
| 6,904,988 B2 * | 6/2005 | Harrup et al. | 180/65.6 |
| 6,935,451 B2 * | 8/2005 | Bell et al. | 180/65.25 |
| 6,948,576 B2 * | 9/2005 | Angeles | 180/23 |
| 6,973,982 B2 * | 12/2005 | Yoshikawa et al. | 429/430 |
| 6,978,853 B2 * | 12/2005 | Bennett | 180/65.1 |
| 7,083,015 B2 * | 8/2006 | Ruppert et al. | 180/65.1 |
| 7,112,155 B2 * | 9/2006 | Keuth | 475/6 |
| 7,255,187 B2 * | 8/2007 | Bell et al. | 180/65.25 |
| 7,276,005 B2 * | 10/2007 | Morikawa | 475/5 |
| 7,314,105 B2 * | 1/2008 | Varela | 180/65.6 |
| 7,353,904 B2 * | 4/2008 | Phillips | 180/253 |
| 7,363,995 B2 * | 4/2008 | Downs et al. | 180/65.1 |
| 7,364,528 B2 * | 4/2008 | Brill et al. | 475/332 |
| 7,441,623 B2 * | 10/2008 | Casey et al. | 180/243 |
| 7,448,458 B2 * | 11/2008 | Meyer | 180/65.31 |
| 7,458,433 B2 * | 12/2008 | Harrup et al. | 180/65.6 |
| 7,533,747 B2 * | 5/2009 | Heinen | 180/65.51 |
| 7,635,039 B2 * | 12/2009 | Fujiwara et al. | 180/65.21 |
| 7,845,445 B2 * | 12/2010 | Cooper et al. | 180/65.51 |
| 7,854,674 B2 * | 12/2010 | Freudenreich | 475/5 |
| 7,866,423 B2 * | 1/2011 | Ruppert et al. | 180/65.1 |
| 7,975,790 B2 * | 7/2011 | Kim et al. | 180/65.51 |
| 8,042,883 B2 * | 10/2011 | Nakano | 303/115.1 |
| 8,091,677 B2 * | 1/2012 | Murty | 180/293 |
| 2001/0004948 A1 * | 6/2001 | Ruppert et al. | 180/65.6 |
| 2001/0011611 A1 * | 8/2001 | Poerschmann | 180/65.1 |
| 2003/0010547 A1 * | 1/2003 | Wachauer | 180/65.1 |
| 2003/0067234 A1 * | 4/2003 | White et al. | 310/112 |
| 2003/0127260 A1 * | 7/2003 | Angeles | 180/23 |
| 2004/0089485 A1 * | 5/2004 | Kramer et al. | 180/65.1 |
| 2004/0124019 A1 * | 7/2004 | Harrup et al. | 180/65.1 |
| 2005/0006967 A1 * | 1/2005 | Bologna | 310/83 |
| 2005/0049103 A1 * | 3/2005 | Pecnik et al. | 475/221 |
| 2005/0092533 A1 * | 5/2005 | Ishii | 180/65.1 |
| 2005/0124451 A1 * | 6/2005 | Morikawa | 475/6 |
| 2006/0037792 A1 * | 2/2006 | Boss et al. | 180/65.6 |
| 2006/0054368 A1 * | 3/2006 | Varela | 180/65.5 |
| 2006/0118344 A1 * | 6/2006 | Rosch | 180/65.1 |
| 2006/0180366 A1 * | 8/2006 | Brill et al. | 180/65.6 |
| 2006/0225930 A1 * | 10/2006 | Schulte | 180/65.4 |
| 2007/0068723 A1 * | 3/2007 | Brill et al. | 180/374 |
| 2007/0137908 A1 * | 6/2007 | Fujiwara et al. | 180/65.2 |
| 2007/0158119 A1 * | 7/2007 | Pascoe | 180/65.2 |
| 2008/0179116 A1 * | 7/2008 | Ikenoya et al. | 180/63 |
| 2008/0202826 A1 * | 8/2008 | Freudenreich | 180/6.5 |
| 2009/0014223 A1 * | 1/2009 | Jones et al. | 180/65.8 |
| 2009/0071732 A1 * | 3/2009 | Kim et al. | 180/24.07 |
| 2009/0091093 A1 * | 4/2009 | Urababa et al. | 280/5.511 |
| 2009/0242289 A1 * | 10/2009 | Murty | 180/65.265 |
| 2010/0108417 A1 * | 5/2010 | Gilmore | 180/65.51 |
| 2011/0094807 A1 * | 4/2011 | Pruitt et al. | 180/65.6 |
| 2011/0109052 A1 * | 5/2011 | Hatzikakidis | 280/5.5 |
| 2011/0139522 A1 * | 6/2011 | Takenaka et al. | 180/65.1 |
| 2011/0144848 A1 * | 6/2011 | Yoshizue et al. | 701/22 |
| 2011/0175475 A1 * | 7/2011 | Makino et al. | 310/78 |
| 2011/0209934 A1 * | 9/2011 | Armbruster et al. | 180/65.25 |
| 2011/0232978 A1 * | 9/2011 | Schoon | 180/6.5 |
| 2011/0232984 A1 * | 9/2011 | Wurm | 180/69.6 |
| 2011/0259657 A1 * | 10/2011 | Fuechtner | 180/65.21 |
| 2012/0052995 A1 * | 3/2012 | Scarbo et al. | 474/86 |
| 2012/0080247 A1 * | 4/2012 | Schmid et al. | 180/65.1 |
| 2012/0103708 A1 * | 5/2012 | Hennings et al. | 180/65.6 |
| 2012/0217789 A1 * | 8/2012 | Yamamoto et al. | 301/6.5 |
| 2012/0229004 A1 * | 9/2012 | Takahashi et al. | 310/67 R |
| 2012/0258831 A1 * | 10/2012 | Knoblauch et al. | 475/5 |
| 2012/0279793 A1 * | 11/2012 | Kikuchi et al. | 180/197 |

FOREIGN PATENT DOCUMENTS

| | | |
|---|---|---|
| DE | 296 11 867 | 10/1996 |
| DE | 295 18 401 | 4/1997 |
| DE | 202 13 607 | 3/2004 |
| DE | 10 2004 003 634 | 11/2005 |
| DE | 102009033531 A1 | 1/2011 |
| WO | 2010021413 A2 | 2/2010 |

* cited by examiner

CHASSIS FOR A MOTOR VEHICLE HAVING AN ELECTRICAL AXLE

CROSS-REFERENCE TO RELATED APPLICATION

This application claims priority under 35 USC 119 to German Patent Application No. 10 2010 010 438.8, filed on Feb. 26, 2010, the entire disclosure of which is incorporated herein by reference.

BACKGROUND OF THE INVENTION

1. Field of the Invention

The invention relates to a chassis for a motor vehicle, having an electrical axle with two electrical machines and wheels rotatably mounted in the region of the two ends of the electrical axle. Each wheel to be driven by one of the electrical machines. A step-down gear mechanism is arranged between the respective electrical machine and the wheel associated with the electrical machine.

2. Description of the Related Art

DE 295 18 401 U1 discloses the above-described type of chassis used in a utility vehicle. This utility vehicle is a city bus for transporting people. A carriage floor is arranged at a low level of the city bus and runs through the entire bus, including the region of the rear axle, which is in the form of a rigid axle. To achieve this configuration, the electrical axle is a hollow portal axle and the two electrical machines are in the form of electric drive motors accommodated by the portal axle. A step-down gear mechanism in the form of a spur gear stage is arranged between the respective electrical machine and the wheel associated with the electrical machine. As an alternative, the electrical machines are mounted next to the portal axle. DE 296 11 867 U1 also discloses a chassis having the features of the type mentioned above.

DE 44 34 237 A1 discloses a vehicle axle having two electric single-wheel drives for agricultural vehicles. The two single-wheel drives can be connected in a force-fitting manner by means of a clutch to avoid overloading one single-wheel drive over a relatively long period of time in the event of non-uniform loading of the drive wheels of the vehicle axle. The respective electric single-wheel drive is connected to a step-down gear mechanism in the form of a spur gear stage. The step-down gear mechanism is connected to a planetary gear mechanism that is connected to the wheel associated with the single-wheel drive. The axle of the wheel is offset radially in relation to the rotation axis of the rotor of the electric motor. The electrical input energy for the respective electric motor is generated by a generator driven by the vehicle's own internal combustion engine.

DE 10 2004 003 634 A1 discloses a portal axle drive of a motor vehicle. Torque is introduced from a planetary gear mechanism via a step-down gear mechanism in the form of a spur gear stage and into an output shaft that is connected to the wheel in a rotationally fixed manner.

DE 202 13 670 U1 describes a directly driven drive axle of a motor vehicle having two electric drive motors mounted in a common housing.

The above-described chassis or axle designs disadvantageously relate to rigid portal axles. Chassis of this kind are reserved for use in utility vehicles, buses or agricultural vehicles for vibration and comfort reasons. Furthermore, electrical machines with coaxially arranged rotational axes do not permit any relevant change in length.

The object of the present invention is to provide a chassis of the kind mentioned above but with a separate connection from the respective wheel to the step-down gear mechanism that allows the wheel to be mounted in a non-rigid manner and that permits the overall length of the electrical machines to be varied.

SUMMARY OF THE INVENTION

The object is achieved in that the respective step-down gear mechanism is connected to the associated wheel by a cardan shaft, and in that the respective rotation axes of the two electrical machines are substantially parallel and next to one another.

A force-fitting connection between the step-down gear mechanism and the associated wheel by the cardan shaft allows torques to be transmitted without the need for the axle to be rigid. Consequently, in contrast to the motor vehicles described above, the chassis can be provided with an independent wheel suspension system. This considerably expands the field of use for the chassis, in particular to cars in which it is advantageous, for driving comfort and safety to have each wheel can undergo spring compression and spring extension individually and independently of the other wheels of the vehicle.

An electrical axle that has the rotational axes of two electrical machines aligned coaxially limits the length of each electrical machine to about one half the length of the electrical axle. However, the rotational axes of the two electrical machines of the electrical axle of the subject invention are substantially parallel and next to one another in the radial direction. Thus, the length of each electrical machine can be greater than approximately half the length of the electrical axle. The ability to vary the length of the electrical machines also enables the power to be scaled accordingly. Therefore, the power can be scaled in accordance with the vehicle type in the same package. The rotational axes of the two electrical machines can be parallel, but with no overlap, if there is a low power requirement. However, the parallel rotational axes advantageously can be made to overlap in the radial direction to adapt the length of the respective electrical machine to the required power. Therefore, a particularly long length of the respective electrical machine can be presented. The overlap can be of such an extent to reach the step-down gear mechanism of the other electrical machine.

The arrangement of the two electrical machines with the respective rotational axes thereof parallel and next to one another permits the use of electrical machines that are long for generating the required power but, on the other hand, are relatively low narrow. Accordingly, this arrangement of the electrical machines requires relatively little installation space in the longitudinal and vertical extent of the vehicle. The relative dimensions are particularly important in terms of the ground clearance of the vehicle.

The respective cardan shafts preferably are connected to the two ends of the electrical axle coaxially by appropriately dimensioning the respective step-down gear mechanism, for the purpose of driving a respective wheel. Furthermore, clutches for disconnecting each electrical machine from the respective wheel also can be provided between each electrical machine and the respective step-down gear mechanism.

The electrical axle preferably has a housing that is screwed to a chassis support of the motor vehicle by means of a plurality of fixing points.

Each cardan shaft preferably is designed as a double joint with ends connected in a force-fitting manner to an output shaft of the spur gear stage and a wheel hub.

A spur gear stage preferably is used as the step-down gear mechanism and compensates for the radial offset of the electrical axle and the axle of the wheel hub. A planetary gear mechanism preferably is arranged between the respective electrical machine and the spur gear stage that faces the electrical machine. This gear mechanism design between the electrical machine and the associated wheel enables a particularly high torque to be transmitted the wheel.

The electrical axle can be a portal axle that is divided to have portal axle sections arranged next to one another for accommodating the electrical machines. The spur gear stage and/or the planetary gear mechanism can be integrated in the respective portal axle section. The portal axle sections are fixed to the chassis support by vibration-damped holders.

The housing of the respective electrical machine expediently is formed by the housing of the respective portal axle section. The stator of the respective electrical machine therefore is mounted in the housing in a rotationally fixed manner.

A rotation angle sensor preferably is provided in each case for detecting the position of the rotor of the electrical machine. To this end, a magnet may be provided in the shaft of the respective electrical machine and the position of the magnet is detected by the associated sensor.

A torque sensor preferably is provided for detecting the torque in the drive train of the respective wheel. As a result, the electric drives can be controlled individually in accordance with the desired torque that is to be introduced by the respective wheel.

The invention further proposes a motor vehicle, in particular a car, having a front axle and a rear axle. The front axle and/or the rear axle is equipped with the above-described chassis and has an independent wheel suspension system. The motor vehicle preferably has the front axle equipped with the above-described chassis and the rear axle is driven by an internal combustion engine.

The motor vehicle preferably has an energy storage means, and the electrical machines are active during motor operation and during generator operation.

The chassis of the invention therefore is used in a vehicle that can be driven by a hybrid drive. The hybrid system functions to increase the vehicle power and reduce consumption, in particular in a sports car, by adding the additional electrical drive machines and the energy storage means. A positive or negative torque that is specific to the wheel can be impressed on the drive shafts at the front axle of the motor vehicle by the two electrical machines. The vehicle is accelerated (motor mode) or decelerated (generator mode) by operating the electrical machines. The energy storage means is discharged or charged in the process.

The electrical axle transmits torque from the electrical machines to the front wheels of the vehicle by a suitable step-down means. To this end, a two-stage gear mechanism comprising a planetary gear stage and a spur gear stage is flange-connected to the output shafts of each electrical machine. The output shafts of the gear mechanism are connected directly to the wheels by cardan shafts. A separable clutch is not provided. The gear mechanism transmission ratios allow a significant increase in the maximum torque that can be transmitted by the electrical axle. Therefore, the torque produced at the respective wheel readily can be multiplied, for example, by a factor of 6 to 8.

The step-down means on both sides of the portal axle function to adapt the rotation speed and secondly to adjust the height in the Z direction to ensure a mechanical connection to the cardan shafts. The portal axle should be installed as close as possible to the undercarriage of the vehicle to achieve a low center of gravity and should be as far away from the undercarriage of the vehicle as possible to provide more ground clearance. The portal axle preferably is positioned directly behind a steering gear mechanism of the vehicle.

A preferred exemplary embodiment is explained in greater detail in the following description and illustrated in the drawing.

DETAILED DESCRIPTION OF THE PREFERRED EMBODIMENTS

Figure 1:
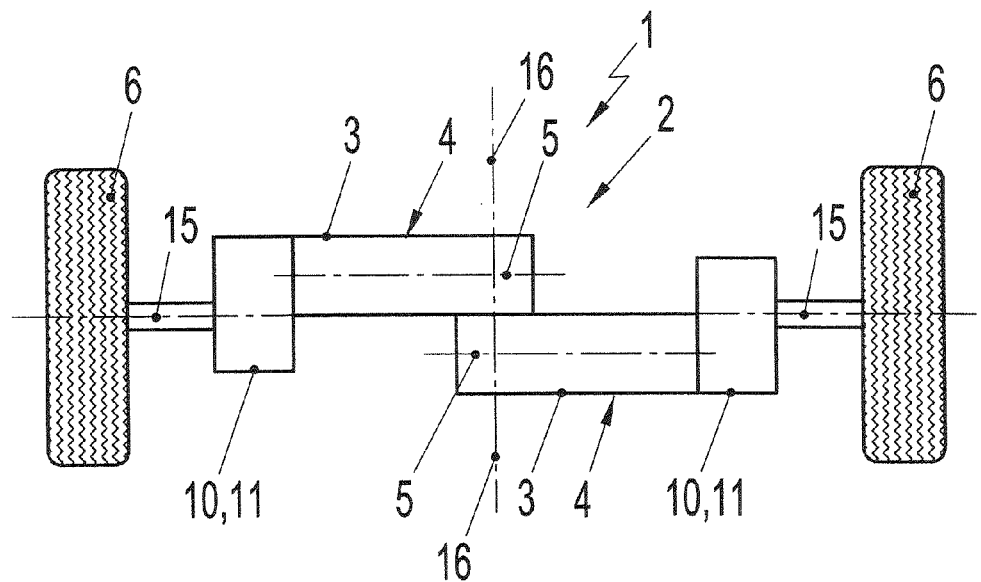
FIG. 1 is a schematic plan view of the chassis according to the invention.

The motor vehicle equipped with the chassis of the invention preferably is a car intended to be used in racing. The individually suspended wheels of the car that are associated with the rear axle are driven by an internal combustion engine. The wheels associated with the front axle also are individually suspended and can be driven by electric motor to apply an additional drive torque by means of the front wheels. The following description relates to the design of the motor vehicle in the region of the front axle and the chassis of the invention in this respect. This chassis 1 has an electrical axle 2 that is designed as a portal axle with two portal axle sections in the form of tubes that represent the housings 3 for accommodating two electrical machines 4. The housings 3 and the electrical machines 4 are arranged parallel and next to one another in relation to their rotation axes 5, with the spacing between the rotation axes 5, taking into account the outside diameter of the electrical machines 4, being of a magnitude so that the electrical machines 4 can partially overlap in their longitudinal extent and can make contact in the region of overlap. The length of overlap between the two electrical machines 4, as shown in FIG. 1, is selected so that the line formed by the length of overlap is arranged symmetrically to the longitudinal center axis 16 of the motor vehicle. The longitudinal center axis 16 is the longitudinal center axis between the two front wheels 6 in relation to driving in a straight line.

Figure 2:
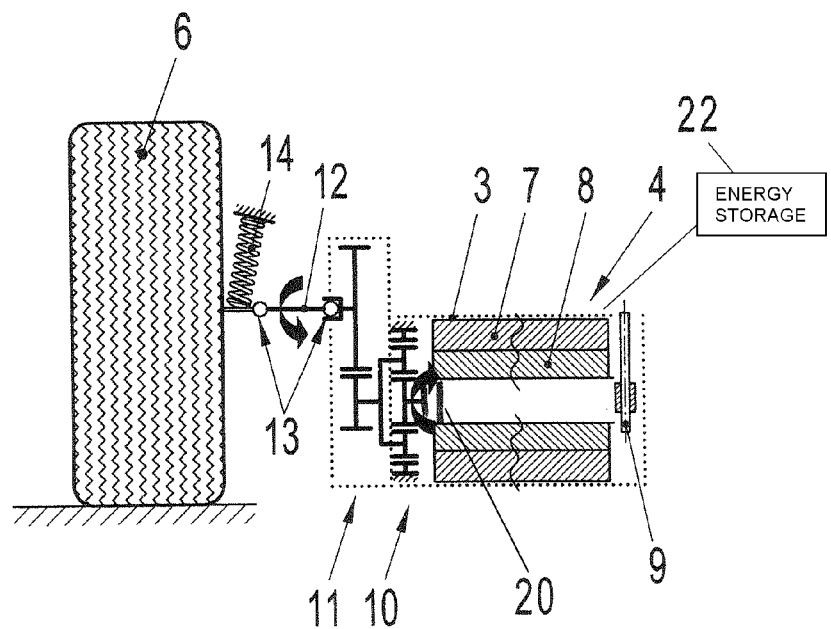
FIG. 2 shows the design of the chassis shown in FIG. 1, including the wheels associated with the electrical axle for the electric drive of one wheel, with the electric drive of the other wheel being of corresponding design.

FIG. 2 is a detailed illustration of the design of the chassis in the region of one front wheel 6 and the electrical machine 4 associated with the front wheel 6 and of the means for transmitting the drive torque of the electrical machine 4 to the front wheel 6. The drive for the other front wheel 6 is of corresponding design, with, according to the illustration in FIG. 1, the electrical machines 4 associated with the two front wheels 6 overlapping and making contact. The shown electrical machine 6 shown in FIG. 2 is illustrated with an interruption in its length extent to show that this electrical machine 4 or the electrical machines 4 can have a length scaled to meet the power requirements of the vehicle, and therefore an electrical machine 4 of defined length is used in accordance with the power requirement of the existing vehicle type.

FIG. 2 shows that the stator 7 of the respective electrical machine 4 is mounted in the housing 3 of the electrical machine 4 in a rotationally fixed manner. The stator 7 of the respective electrical machine 4 contains the rotor 8 of said electrical machine.

The respective electrical machine 4 has an associated rotation angle sensor 9 that detects the rotation angle of the respective rotor 8. The rotation speed of the rotor 8 also preferably can be determined by the sensor, which is in the form of a rotation speed sensor, to enable actuation of the two electrical machines 4 in accordance with the desired driving states.

The vehicle has an energy storage means, and therefore the electrical machines 4 can be active in the motor mode or in the generator mode.

A planetary gear mechanism 10 is flanged-connected to the end of the housing 3 that faces the respective wheel 6. A further step-down gear mechanism in the form of a spur gear stage 11 is arranged downstream of the planetary gear mechanism 10 in relation to the flow of torque. The spur gear stage is flange-connected to the planetary gear mechanism 10.

The above-described portal axle 2 is located in the front end in the region of the front axle. To obtain a low center of gravity, the portal axle 2 is positioned as close as possible to the undercarriage of the vehicle. Furthermore, the portal axle 2 is positioned as closely as possible to a steering gear mechanism of the vehicle.

The portal axle 2 is fixed to a chassis support of the vehicle by two holders. The holders are screwed to the gear mechanism arrangement comprising the planetary gear mechanism 10 and the spur gear stage 11 by vibration-damping bearings.

The output shaft of the respective electrical machine 4 is connected to the sun gear of the associated planetary gear mechanism 10 in a rotationally fixed manner. The annulus gear of the planetary gear mechanism 10 is stationary. The planet carrier that accommodates the planetary gears is connected to the pinion of the spur gear stage 11 in a rotationally fixed manner, with the spur gear stage engaging with the larger gear of the spur gear stage 11. A clutch 20 may be provided for disconnecting the electrical machine 4 from the respective wheel 6 and may be arranged between the respective electrical machine 4 and the step-down gear mechanism 10, 11 associated with the electrical machine 4.

A cardan shaft 12 has a joint 13 in the region of the two ends and is connected to the output of the respective spur gear stage 11 in a rotationally fixed manner. The cardan shaft 12 also is connected to the hub of the associated front wheel 6 of the vehicle in a rotationally fixed manner in the region of that end of the cardan shaft which is opposite the associated spur gear stage 11. The connection of the cardan shafts 12 to the step-down gear mechanism, in the present case the output shafts of the spur gear stages 11, is coaxial, as also is illustrated by the rotation axes 15 of these output shafts. Reference numeral 14 designates a sprung bearing for the respective front wheel 6. This is intended to illustrate an independent suspension system of the wheel 6 in a highly simplified manner.

FIG. 2 clearly shows that, when the chassis is formed with cardan shafts 12, the chassis is electrically driven by an energy storage 22, with the electrical machines 4 and the housing 3 being arranged at a lower level than that of the rotation axes of the wheels 6.

In FIG. 2, the arrows represent torque arrows for indicating the torque in the region of the respective electrical machine 4 and the cardan shaft 12 associated with the electrical machine, independently of whether the respective electrical machine 4 is in a motor mode or generator mode.

What is claimed is:

1. A chassis for a motor vehicle, having an electrical axle with opposite ends, electrical machines between the ends of the electrical axle, wheels being rotatably mounted respectively in regions of the ends of the electrical axle so that each of the wheels is driven by one of the electrical machines, step-down gear mechanisms arranged between the respective electrical machines and the respective wheel driven by each electrical machine, each of the step-down gear mechanisms being connected to the wheel associated with the respective step-down gear mechanism by a cardan shaft, rotation axes of the two electrical machines being arranged parallel to and offset from one another, and ends of the electrical machines remote from the wheels being next to one another and overlapped to define an overlap area arranged symmetrically to a longitudinal center axis of the motor vehicle.

2. The chassis of claim 1, wherein the two electrical machines are in contact with one another in the overlap area.

3. The chassis of claim 1, connections of the cardan shafts to the step-down gear mechanisms are coaxial.

4. The chassis of claim 1, wherein the step-down gear mechanism has a spur gear stage.

5. The chassis of claim 4, ends of the respective cardan shaft are connected in a force-fitting manner to an output shaft of the spur gear stage and a wheel hub.

6. The chassis of claim 4, wherein the step-down gear mechanism has a planetary gear mechanism, the planetary gear mechanism being arranged between the respective electrical machine and the spur gear stage associated with the respective electrical machine.

7. The chassis of claim 1, wherein the electrical axle has housings that accommodate the electrical machines or form constituent parts of the electrical machines.

8. The chassis of claim 1, wherein a clutch for disconnecting the electrical machine from the respective wheel is arranged between the respective electrical machine and the step-down gear mechanism associated with the electrical machine.

9. The chassis of claim 1, further comprising a rotation angle sensor for detecting a rotation angle of a rotor of the respective electrical machine.

10. The chassis of claim 9, wherein the rotation angle sensor is mounted in a housing of the electrical axle.

11. A motor vehicle having a front axle and a rear axle, one of the front axle and the rear axle being equipped with the chassis of claim 1 and having an independent wheel suspension system.

12. The motor vehicle of claim 11, wherein the front axle is equipped with the chassis and the rear axle is driven by an internal combustion engine.

13. The motor vehicle of claim 11, wherein the rear axle is equipped with the chassis and the front axle is driven by an internal combustion engine.

14. The motor vehicle of claim 11, further comprising an energy storage, and the electrical machines being active during motor operation and during generator operation.

15. A motor vehicle, comprising: an electrical axle with opposite left and right ends and having left and right electrical machines in proximity respectively to the left and right ends of the electrical axle; left and right wheels rotatably mounted respectively in regions of the left and right ends of the electrical axle so that the left wheel is driven by the left electrical machine and the right wheel is driven by the right electric machine; a left step-down gear mechanism between the left electrical machine and the left wheel and a right step-down gear mechanism between the right electrical machine and the right wheel; a left cardan shaft connecting the left step-down gear mechanism to the left wheel and a right cardan shaft connecting the right step-down gear mechanism to the right wheel, rotation axes of the left and right electrical machines being parallel to and offset from one another, and ends of the electrical machines remote from the wheels being next to one another and overlapped to define an overlap area substantially symmetrical to a longitudinal center axis of the motor vehicle.

16. The motor vehicle of claim 15, wherein the left and right electrical machines are in contact with one another in the overlap area.

17. The motor vehicle of claim 16, wherein one of the left and right electrical machines is more forward than the other of the left and right electrical machines.

18. The motor vehicle of claim 17, wherein the rotation axes of the electric machines are lower than rotation axes of the wheels.

* * * * *